(12) United States Patent
Jha et al.

(10) Patent No.: US 10,618,672 B2
(45) Date of Patent: Apr. 14, 2020

(54) EXTERIOR AIRCRAFT LIGHT UNIT, HELICOPTER, AND AIRPLANE

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE); Norbert Menne, Paderborn (DE); Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 251 days.

(21) Appl. No.: 15/680,266

(22) Filed: Aug. 18, 2017

(65) Prior Publication Data

US 2018/0050820 A1    Feb. 22, 2018

(30) Foreign Application Priority Data

Aug. 19, 2016  (EP) ..................................... 16184924

(51) Int. Cl.
| | |
|---|---|
| *B64D 47/00* | (2006.01) |
| *B64D 47/06* | (2006.01) |
| *F21S 43/19* | (2018.01) |
| *F21S 43/20* | (2018.01) |
| *B64D 47/04* | (2006.01) |
| *F21Y 113/10* | (2016.01) |

(52) U.S. Cl.
CPC ............. *B64D 47/06* (2013.01); *B64D 47/04* (2013.01); *F21S 43/19* (2018.01); *F21S 43/26* (2018.01); *F21Y 2113/10* (2016.08)

(58) Field of Classification Search
CPC ........ B64D 47/04; B64D 47/06; B64D 47/02; F21S 43/19; F21S 43/26; F21Y 2113/10
See application file for complete search history.

(56) References Cited

U.S. PATENT DOCUMENTS

| 5,293,304 A | 3/1994 | Godfrey |
| 6,962,423 B2 | 11/2005 | Hamilton et al. |
| 2010/0046241 A1* | 2/2010 | Lundberg ............... B64D 47/06 362/470 |
| 2011/0019430 A1 | 1/2011 | Wilkinson et al. |

(Continued)

FOREIGN PATENT DOCUMENTS

| DE | 202010002772 U1 | 7/2010 |
| EP | 2985229 A1 | 2/2016 |
| WO | 2013181402 A2 | 12/2013 |

OTHER PUBLICATIONS

European Search Report for Application No. 16184924.5-1754 dated Feb. 2, 2017, 5 pages.

*Primary Examiner* — Y M. Lee
(74) *Attorney, Agent, or Firm* — Cantor Colburn LLP (57) ABSTRACT

An exterior aircraft light unit includes a housing; a mounting structure, mounted to the housing and extending away from the housing substantially along a first cross-sectional plane; a lens cover, mounted to the housing, surrounding the mounting structure, and defining an inner space of the exterior aircraft light unit, with the mounting structure dividing the inner space of the exterior aircraft light unit into a first partial inner space and a second partial inner space; a plurality of anti-collision light sources, configured to emit respective sequences of warning light flashes in operation.

16 Claims, 6 Drawing Sheets

(56) References Cited

U.S. PATENT DOCUMENTS

2014/0119010 A1* 5/2014 Sawada .................. F21V 7/06
                                                    362/296.08
2014/0355281 A1  12/2014 Lapujade
2015/0274319 A1  10/2015 Jha et al.

\* cited by examiner

EXTERIOR AIRCRAFT LIGHT UNIT, HELICOPTER, AND AIRPLANE

FOREIGN PRIORITY

This application claims priority to European Patent Application No. 16184924.5 filed Aug. 19, 2016, the entire contents of which is incorporated herein by reference.

TECHNICAL FIELD

The present invention is in the field of exterior aircraft lighting. In particular, it is in the field of exterior aircraft light units that are provided for passive visibility of the aircraft.

BACKGROUND

Almost all aircraft are equipped with exterior aircraft light units. In particular, exterior aircraft light units for passive visibility make up an important part of the exterior aircraft lighting of most aircraft. For example, most aircraft are equipped with white flashing anti-collision light units, red flashing anti-collision light units, often also referred to as beacon light units, red, green and white navigation light units, etc. These light units are provided for attracting attention to the aircraft and for allowing observers to deduce the flight direction of the aircraft. Many of these exterior aircraft light units are considered safety-critical and are required by applicable regulations, such as the Federal Aviation Regulations (FAR). Exterior aircraft light units add weight to the aircraft, pose restrictions on the aircraft design in terms of its aerodynamics, and require a significant amount of maintenance, leading to extended downtimes of the aircraft. New lighting systems, addressing one or more of these issues, may be beneficial.

Accordingly, it would be beneficial to provide an exterior aircraft light unit that allows for the provision of improved exterior aircraft lighting systems. Further, it would be beneficial to provide a helicopter and an airplane, equipped with such exterior aircraft light units.

SUMMARY

Exemplary embodiments of the invention include an exterior aircraft light unit, comprising a housing; a mounting structure, mounted to the housing and extending away from the housing substantially along a first cross-sectional plane; a lens cover, mounted to the housing, surrounding the mounting structure, and defining an inner space of the exterior aircraft light unit, with the mounting structure dividing the inner space of the exterior aircraft light unit into a first partial inner space and a second partial inner space; a plurality of anti-collision light sources, configured to emit respective sequences of warning light flashes in operation, wherein the plurality of anti-collision light sources are arranged on the mounting structure and jointly provide for an anti-collision light output opening angle of at least 180° in the first cross-sectional plane; at least one first forward navigation light source and at least one first forward navigation optical system, configured to emit a continuous first forward navigation light output in operation, wherein the at least one first forward navigation light source and the at least one first forward navigation optical system are arranged in the first partial inner space; and at least one second forward navigation light source and at least one second forward navigation optical system, configured to emit a continuous second forward navigation light output in operation, wherein the at least one second forward navigation light source and the at least one second forward navigation optical system are arranged in the second partial inner space; wherein the first forward navigation light output and the second forward navigation light output jointly provide for a forward navigation light output opening angle of at least 160° in a second cross-sectional plane, substantially orthogonal to the first cross-sectional plane.

Exemplary embodiments of the invention allow for the provision of an exterior aircraft light unit that can satisfy anti-collision lighting requirements in an angular range of 180° in the horizontal cross-sectional plane, while at the same time being able to satisfy the lighting requirements for one forward navigation light. In this way, the lighting functionality that is distributed among separate forward navigation and anti-collision light units in previous approaches can be combined in a single exterior aircraft light unit. Moreover, the exterior aircraft light unit, as described above, has such a design that the provision of two such exterior aircraft light units, disposed on the left and right sides of the aircraft, allows for satisfying the anti-collision and forward navigation lighting requirements of the aircraft with two light units only. This is a significant reduction in the number of light units as compared to prior approaches, where the anti-collision and forward navigation lighting functionalities were implemented various separate light units. The reduction of the number of exterior aircraft light units leads to one or more of a reduction in weight, a reduction of mechanical structures disturbing the aircraft aerodynamics, a reduction of power consumption, and a reduction of the number of light units to be maintained and replaced.

The provision of the first and second forward navigation light sources on opposite sides of the mounting structure allows for the anti-collision lighting functionality and the forward navigation lighting functionality to be provided in a very compact arrangement, without the light sources and mounting structures blocking each other. In particular, the mounting structure can be kept small to accommodate the plurality of anti-collision light sources that jointly provide for the anti-collision light output opening angle of at least 180° in the first cross-sectional plane. At the same time, the provision of two forward navigation light sources for the same forward navigation lighting functionality, i.e. for the right or left forward navigation lighting functionality, makes the positioning of these forward navigation light sources flexible on the two sides of the mounting structure, because the blocking by the mounting structures towards the respectively other hemisphere does not hurt in terms of the overall forward navigation light output.

The first and second forward navigation light outputs are of the same color. In particular, the first and second forward navigation light outputs may be of red color, in particular of aviation red color, or of green color, particular of aviation green color. In this way, both the first and second forward navigation light outputs cooperate to implement the functionality of either the left forward navigation light or the right forward navigation light of an aircraft. It is possible that the at least one first forward navigation light source and the at least one second forward navigation light source are light sources of a red or green colour, i.e. that the light sources themselves emit red or green colored light. It is also possible that the at least one first forward navigation optical system and the at least one second forward navigation optical system have respective color filters, only passing red or green light. In this way, white light sources can be used for the first and second forward navigation light sources.

The mounting structure is mounted to the housing and extends away from the housing substantially along a first cross-sectional plane. While the mounting structure can be an extended structure in various dimensions, its main direction of extension is in said first cross-sectional plane. In particular, the mounting structure may extend away from a wall of the housing that is substantially orthogonal to the first cross-sectional plane.

The inner space of the exterior aircraft light unit is defined by the lens cover. In particular, the lens cover may have a convex shape, when seen from outside of the exterior aircraft light unit. It further may be a hollow structure, with this hollow structure defining the inner space of the exterior aircraft light unit. In particular, the inner space may be surrounded by the inner surface of the lens cover and the housing, in particular said lateral wall of the housing extending orthogonal to the first cross-sectional plane.

The mounting structure divides the inner space of the exterior aircraft light unit into a first partial inner space and a second partial inner space. This division of the inner space into two partial inner spaces does not mean that a complete separation between these two partial inner spaces is present. It is possible that the lens cover is spaced from the mounting structure, such that the first and second partial inner spaces are connected to each other via this space between the mounting structure and the lens cover. The division of the inner space into two partial inner spaces only means that two more or less independent partial inner spaces are present on the two sides of the mounting structure. In particular, it means that two partial inner spaces for arranging components of the exterior aircraft light unit are provided on the opposite sides of the mounting structure.

According to a further embodiment, the first forward navigation light output and the second forward navigation light output are symmetrical with respect to the first cross-sectional plane. In particular, the arrangement of the at least one first forward navigation light source and the at least one first forward navigation optical system on the one hand and the at least one second forward navigation light source and the at least one second forward navigation optical system may be symmetrical with respect to the first cross-sectional plane. In this way, the exterior aircraft light unit is well-suited to provide a symmetrical forward navigation light output with respect to the horizontal cross-sectional plane.

According to a further embodiment, the at least one first forward navigation optical system and the at least one second forward navigation optical system are respective lens. In particular, they are configured to transform a standard output light intensity distribution of a light source into the first and second forward navigation light outputs, respectively.

The at least one first forward navigation light source may be exactly one first forward navigation light source, associated with exactly one first forward navigation optical system. Also, the at least one second forward navigation light source may be exactly one second forward navigation light source, associated with exactly one second forward navigation optical system.

According to a further embodiment, the plurality of anti-collision light sources jointly provide for an anti-collision light output opening angle of between 180° and 240° in the first cross-sectional plane, in particular of between 180° and 210°. In this way, the opening angle in the first cross-sectional plane ensures that the provision of two such exterior aircraft light units allows for a provision of 360° anti-collision lighting functionality, while the light is efficiently concentrated in an opening angle of 180° or somewhat more. Also, the exterior aircraft light unit is kept compact by limiting the anti-collision light output opening angle to values that are at most slightly above 180°.

According to a further embodiment, the first forward navigation light output and the second forward navigation light output jointly provide for a forward navigation light output opening angle of between 160° and 200° in the second cross-sectional plane, in particular of between 180° and 200°, further in particular of about 180°.

According to a further embodiment, each of the first and second forward navigation light outputs may have an opening angle in the second cross-sectional plane of at least 80°, in particular of between 80° and 100°, further in particular of about 90°. This opening angle of the first and second forward navigation light outputs may be achieved via the respective optical systems or via light blocking by the mounting structure.

According to a further embodiment, the first forward navigation light output and the second forward navigation light output may each provide for a forward navigation light output opening angle of about 110° in the first cross-sectional plane. In this way, standard regulations for forward navigation lights can be satisfied.

The second cross-sectional plane may be a vertical plane substantially in the front/rear direction of the aircraft. However, it is also possible that the second cross-sectional plane is another vertical cross-sectional plane. Further in particular, the first forward navigation light output and the second forward navigation light output may jointly provide for a forward navigation light output opening angle of at least 160° in a plurality of second cross-sectional planes, substantially orthogonal to the first cross-sectional plane.

According to a further embodiment, the plurality of anti-collision light sources are arranged on the mounting structure in a curved pattern. In this way, the plurality of anti-collision light sources are arranged in different orientations in the first cross-sectional plane, thus making the light distribution over the anti-collision light output opening angle of at least 180° in the first cross-sectional plane particularly convenient. In particular, the plurality of anti-collision light sources may be arranged to have their principle light emission directions in the first cross-sectional plane. In other words, they may be directed outwards from the mounting structure. It is also possible that the plurality of anti-collision light sources are arranged towards the first partial inner space or towards the second partial inner space, with one or more reflectors reflecting the light of the plurality of anti-collision light sources laterally outwards.

According to a further embodiment, the mounting structure comprises a mounting plate having a curved side face, distal from the housing, and the plurality of anti-collision light sources are arranged on the curved side face. In this way, the plurality of anti-collision light sources are conveniently distributed in a curved pattern, naturally emitting light into a large opening angle of the first cross-sectional plane. At the same time, the arrangement of the anti-collision light sources on the curved ide face allows for providing a large opening angle in cross-sectional planes orthogonal to the first cross-sectional plane, with this large opening angle covering both sides of the first cross-sectional plane.

According to a further embodiment, the curved side face is one of substantially circular and substantially elliptical. In particular, the plurality of anti-collision light sources may be arranged along substantially the entire curved side face, at least within an angular range of 150°, when measured from the housing in the first cross-sectional plane. The plurality of anti-collision light sources may be distributed in a regular manner along the curved side face. The provision of a substantially circular curved side face and a regular distribution of the plurality of anti-collision light sources allows for a particularly regular output light intensity distribution of the warning light flashes.

According to a further embodiment, the plurality of anti-collision light sources comprise at least one of a plurality of white anti-collision light sources, a plurality of red anti-collision light sources, and a plurality of infrared anti-collision light sources. In particular, the plurality of anti-collision light sources may comprise any subset or all of white anti-collision light sources, red anti-collision light sources, and infrared anti-collision light sources. The different anti-collision light sources may be arranged in a repetitive pattern on the mounting structure, in particular, they may be arranged in an alternating order. By providing different kinds of anti-collision light sources, the functionalities of different light units, which are provided as separate light units in previous approaches, can be combined into the exterior aircraft light unit according to exemplary embodiments of the invention. This again reduces the total number of light units for the aircraft.

According to a further embodiment, the lens cover has a refractive portion, extending around the first cross-sectional plane, with the refractive portion shaping an anti-collision light output of the warning light flashes. The refractive portion of the lens cover may be arranged to affect the light emitted from the plurality of anti-collision light sources. In particular, it may have a shape and extension around the first cross-sectional plane that affects the majority of the light emitted by the plurality of anti-collision light sources, in particular more than 90% thereof. The refractive portion may be a lens that provides for a slight collimation of the light output from the plurality of anti-collision light sources. The refractive portion may reduce the opening angle of the light emitted by the plurality of anti-collision light sources in cross-sectional planes orthogonal to the first cross-sectional plane. By integrating a refractive portion into the lens cover, it is possible to eliminate the need for any further optical systems shaping the anti-collision light output from the light emitted by the plurality of anti-collision light sources.

According to a further embodiment, the lens cover has a first light passage portion and a second light passage portion, with the first and second light passage portions being arranged on opposite sides of the refractive portion and passing light from the at least one first forward navigation light source and from the at least one second forward navigation light source substantially un-refracted. In other words, the first and second light passage portions may have substantially no effect on the direction of light leaving the first and second forward navigation optical systems. The output light intensity distribution of the forward navigation light output may be substantially unaffected by the lens cover. In this way, the first and second forward navigation optical systems may be designed to achieve a desired forward navigation light output, without accounting for a later altering by the lens cover.

According to a further embodiment, the exterior aircraft light unit further comprises at least one first rearward navigation light source and at least one first rearward navigation optical system, configured to emit a continuous first rearward navigation light output in operation, wherein the at least one first rearward navigation light source and the at least one first rearward navigation optical system are arranged in the first partial inner space; and at least one second rearward navigation light source and at least one second rearward navigation optical system, configured to emit a continuous second rearward navigation light output in operation, wherein the at least one second rearward navigation light source and the at least one second rearward navigation optical system are arranged in the second partial inner space; wherein the first rearward navigation light output and the second rearward navigation light output jointly provide for a rearward navigation light output opening angle of at least 160° in a third cross-sectional plane, substantially orthogonal to the first cross-sectional plane. In this way, a portion of the rear navigation light functionality may also be included into the exterior aircraft light unit in accordance with exemplary embodiments of the invention. In particular, by providing two such exterior aircraft light units, the entire rear navigation light functionality may be provided by the two exterior aircraft light units. In this way, a separate rear navigation light unit, as employed in aircraft lighting systems of previous approaches, may be dispensed with and the total number of light units reduced even further. The first and second rearward navigation light outputs may be of white color, in particular of aviation white color. The first rearward navigation light output and the second rearward navigation light output jointly provide for a rearward navigation light output opening angle of between 160° and 200° in the third cross-sectional plane, in particular of between 180° and 200°, further in particular of about 180°. Each of the first and second rearward navigation light outputs may have an opening angle in the second cross-sectional plane of at least 80°, in particular of between 80° and 100°, further in particular of about 90°. This opening angle of the first and second rearward navigation light outputs may be achieved via the respective optical systems or via light blocking by the mounting structure. The first rearward navigation light output and the second rearward navigation light output may each provide for a rearward navigation light output opening angle of about 70° in the first cross-sectional plane.

According to a further embodiment, the first forward navigation light output and the first rearward navigation light output cover separate angular ranges in the first cross-sectional plane and the second forward navigation light output and the second rearward navigation light output cover separate angular ranges in the first cross-sectional plane.

According to a further embodiment, the exterior aircraft light unit further comprises an infrared navigation light source, configured to emit a continuous infrared navigation light output in operation, wherein the infrared navigation light source is arranged in the first partial inner space, in particular mounted on the mounting structure in the first partial inner space. In this way, the infrared navigation light functionality, which is implemented via one or more separate light units in previous approaches, may also be provided by the exterior aircraft light unit according to exemplary embodiments of the invention, thus further reducing the number of light units of the aircraft lighting system.

According to a further embodiment, all or any subset of the anti-collision light sources, including the white anti-collision light sources, the red anti-collision light sources, and the infrared anti-collision light sources, the first and second forward navigation light sources, the first and second rearward navigation light sources, and the infrared navigation light source, may be LEDs. In this way, a particularly energy-efficient, long-lasting, and low maintenance exterior aircraft light unit may be provided.

According to a further embodiment, the first cross-sectional plane is a horizontal cross-sectional plane, the first partial inner space is an upper inner space of the exterior aircraft light unit, and the second partial inner space is a lower inner space of the exterior aircraft light unit. Analogously, the at least one first forward navigation light source may be at least one upper forward navigation light source, the at least one first forward navigation optical system may be at least one upper forward navigation optical system, the at least one second forward navigation light source may be at least one lower forward navigation light source, and the at least one second forward navigation optical system may be at least one lower forward navigation optical system. Analogously, the at least one first rearward navigation light source may be at least one upper rearward navigation light source, the at least one first rearward navigation optical system may be at least one upper rearward navigation optical system, the at least one second rearward navigation light source may be at least one lower rearward navigation light source, and the at least one second rearward navigation optical system may be at least one lower rearward navigation optical system.

According to a further embodiment, the second and third cross-sectional planes are vertical cross-sectional planes. In particular, the second and third cross-sectional plane may be vertical planes in the front/rear direction of the aircraft. However, they may also be vertical planes that are angled with respect to the front/rear direction of the aircraft.

According to a further embodiment, the exterior aircraft light unit is configured to be mounted to at least one of a lateral end portion of a horizontal stabilizer of a helicopter, a lateral side portion of a fuselage of a helicopter, and a lateral end portion of a wing of an airplane. In this way, the exterior aircraft light unit may be positioned at a laterally outermost position of the aircraft, thus providing the lighting functionalities in a particularly unobstructed manner.

Exemplary embodiment of the invention further include a helicopter, comprising a first exterior aircraft light unit in accordance with any of the embodiments described above and a second exterior aircraft light unit in accordance with any of the embodiments described above, wherein the first exterior aircraft light unit and the second exterior aircraft light unit are arranged on a left side and a right side of the helicopter. In particular, the helicopter may have a horizontal stabilizer, wherein the first exterior aircraft light unit is mounted to a left lateral end portion of the horizontal stabilizer and wherein the second exterior aircraft light unit is mounted to a right lateral end portion of the horizontal stabilizer.

Exemplary embodiment of the invention further include an airplane, comprising a first exterior aircraft light unit in accordance with any of the embodiments described above and a second exterior aircraft light unit in accordance with any of the embodiments described above, wherein the first exterior aircraft light unit and the second exterior aircraft light unit are arranged on a left side and a right side of the airplane. In particular, the airplane may have a left wing with a left lateral end portion and a right wing with a right lateral end portion, wherein the first exterior aircraft light unit is mounted to the left lateral end portion, and wherein the second exterior aircraft light unit is mounted to the right lateral end portion.

The modifications, additional features, and effects described above with respect to the exterior aircraft light unit apply to the helicopter and the airplane in an analogous manner.

BRIEF DESCRIPTION OF THE DRAWINGS

Further exemplary embodiments of the invention are described in detail with respect the accompanying drawings, wherein.

DETAILED DESCRIPTION

Figure 1:
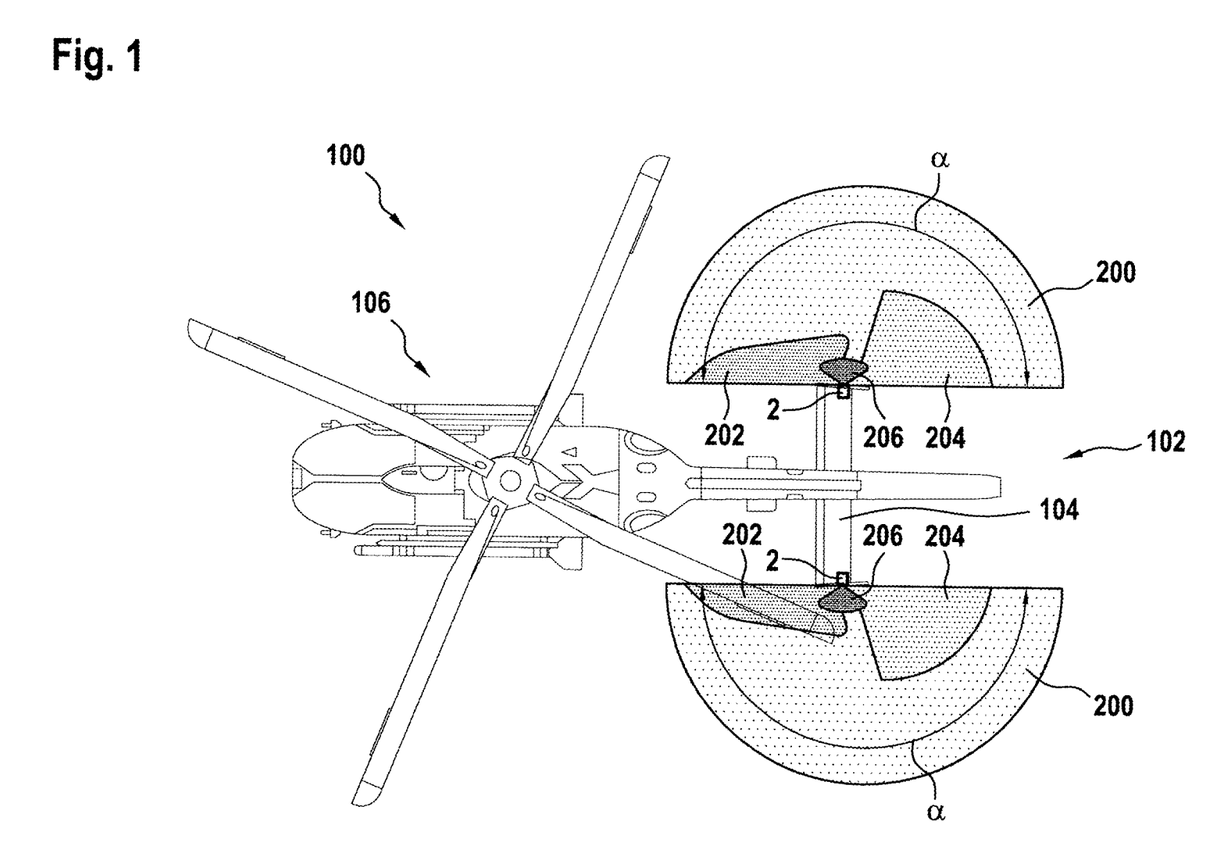
FIG. 1 shows a helicopter according to an exemplary embodiment of the invention in a schematic top view, equipped with two exterior aircraft light units in accordance with exemplary embodiments of the invention.

FIG. 1 shows a helicopter 100 in accordance with an exemplary embodiment of the invention in a schematic top view. The helicopter 100 has a fuselage portion 106 and a tail portion 102. A horizontal stabilizer 104 is attached to the tail portion 102 of the helicopter 100. The horizontal stabilizer 104 is equipped with two exterior aircraft light units 2 in accordance with exemplary embodiments of the invention. The exterior aircraft light units 2 are mounted to the left lateral end portion and the right lateral end portion of the horizontal stabilizer 104, respectively. In this way, the two exterior aircraft light units 2 are mounted to the most lateral stationary portions of the helicopter 100, which allows for the light output of the exterior aircraft light units 2 to be maximally un-obstructed.

Each of the exterior aircraft light units 2 provides for various lighting functionalities. In particular, each of the exterior aircraft light units 2 provides for an anti-collision light output 200, a forward navigation light output 202, a rearward navigation light output 204, and an infrared navigation light output 206. In FIG. 1, the angular output light intensity distributions of these light outputs are schematically shown for the horizontal cross-sectional plane.

In particular, the anti-collision light output 200 has an anti-collision light output opening angle $\alpha$ of 180° in the horizontal cross-sectional plane. Within the entire angular range of the anti-collision light output opening angle $\alpha$, the output light intensity is substantially constant, which is illustrated by the circular depiction of the anti-collision light output 200.

The forward navigation light output 202 has an opening angle of 110° in the horizontal cross-sectional plane. As indicated by the depicted shape of the forward navigation light output 202, the light intensity towards the front is larger than the light intensity towards the side. The exterior aircraft light unit 2, arranged on the right lateral end portion of the horizontal stabilizer 104 emits green light for the forward navigation light output, the exterior aircraft light unit 2, arranged on the left lateral and portion of the horizontal stabilizer 104, emits red light for the forward navigation light output.

The rearward navigation light output 204 has an opening angle of 70° in the horizontal cross-sectional plane. The light intensity towards the rear is slightly larger than the light intensity towards the side, as illustrated by the depicted shape of the rearward navigation light output 204. Both exterior aircraft light units 2 emit white light for the rearward navigation light output 204.

Together, the forward navigation light output 202 and the rearward output navigation 204 have an opening angle of 180° in the horizontal cross-sectional plane, corresponding to the 180° of the anti-collision light output opening angle α. The infrared navigation light output 206 has an opening angle of about 140° in the horizontal cross-sectional plane. The vertical opening angles of above described light outputs will be described below with respect to FIGS. 6 and 7.

It is also possible that the two exterior aircraft light units 2 are arranged on lateral side portions of the fuselage of the helicopter 100. In this way, their light output also has a particularly unobstructed path outwards. Such an arrangement is particularly beneficial if the helicopter in question has a fuselage that is wider than the width of the horizontal stabilizer.

Figure 2:
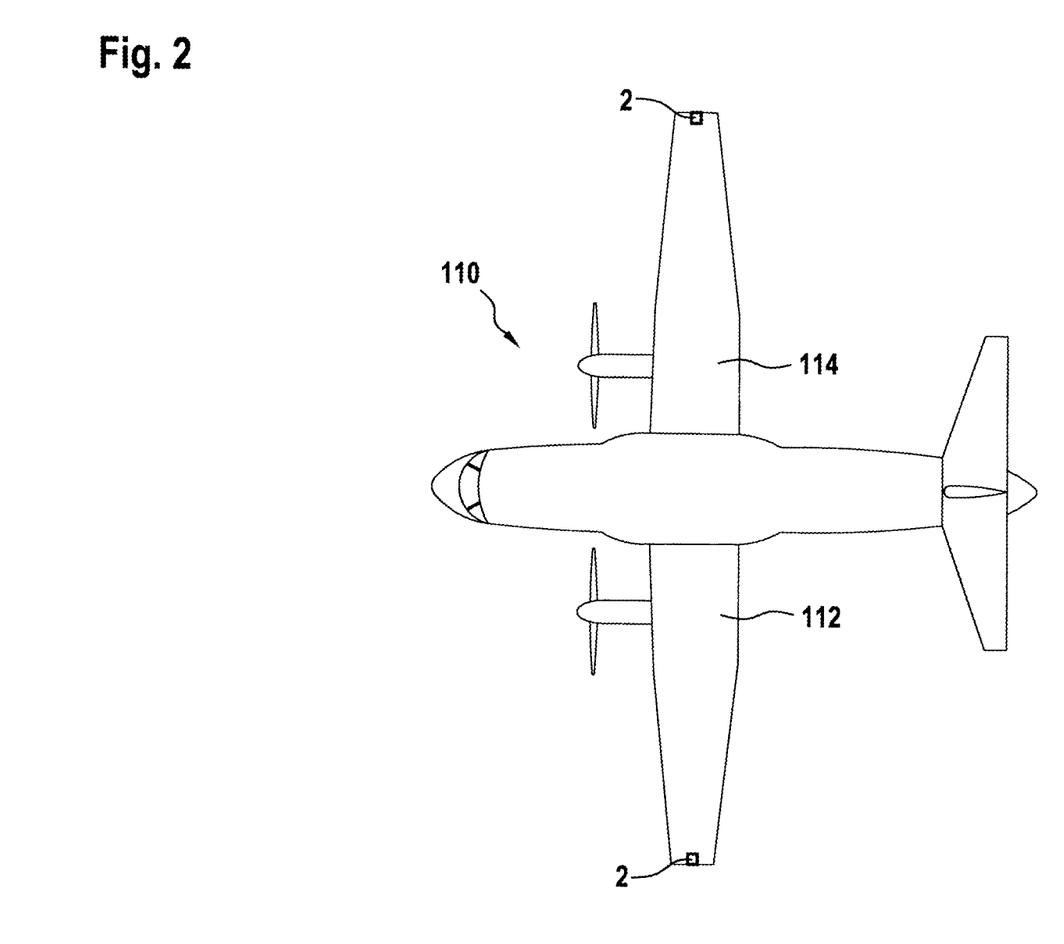
FIG. 2 shows an airplane according to an exemplary embodiment of the invention in a schematic top view, equipped with two exterior aircraft light units in accordance with exemplary embodiments of the invention.

FIG. 2 shows an airplane 110 according to an exemplary embodiment of the invention in a schematic top view. The airplane 110 has a left wing 112 and a right wing 114. Further, the airplane 110 has two exterior aircraft light units 2 in accordance with exemplary embodiments of the invention. The exterior aircraft light units 2 are mounted to a left lateral end portion of the left wing 112 and a right lateral end portion of the right wing of 114, respectively. The exterior aircraft light units 2 of FIG. 2 correspond to the exterior aircraft light units 2 of FIG. 1 and will therefore not be described again. The airplane 110 may in particular be a smaller size airplane, such as a private airplane for recreational or sports purposes. In particular, the airplane 110 may be an airplane of less than 20 passengers.

Figure 3:
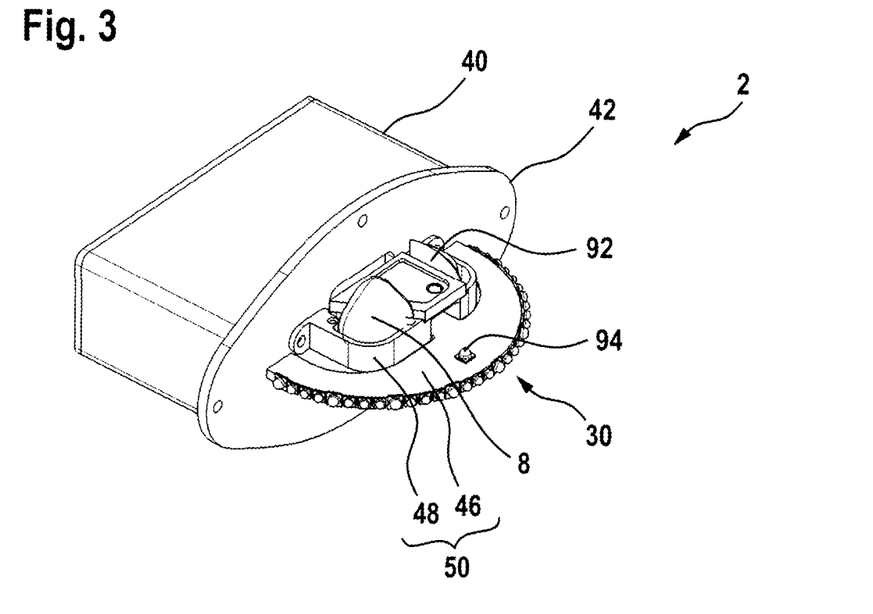
FIG. 3 shows an exterior aircraft light unit according to an exemplary embodiment of the invention in a perspective view.

FIG. 3 shows an exterior aircraft light unit 2 in accordance with an exemplary embodiment of the invention in a perspective view. The exterior aircraft light unit 2 of FIG. 3 may be used for the exterior aircraft light units 2 of FIGS. 1 and 2.

The exterior aircraft light unit 2 has a housing 40. The housing 40 holds components such as a control unit, power supply circuitry, etc. The exterior aircraft light unit 2 may be embedded into the aerodynamic structure of an airplane or a helicopter via inserting the housing 40 into a corresponding recess. The housing 40 has a vertical side wall 42, which is provided for attaching the exterior aircraft light unit 2 to the airplane or helicopter and which blends into the outer contour of the airplane or helicopter. The components attached to the vertical side wall 42 are described in greater detail below. In FIG. 3, the lens cover of the exterior aircraft light unit 2 is not shown for a clearer illustration of the components arranged within the lens cover. The description of FIG. 3 focusses on the components arranged within the inner space of the exterior aircraft light unit 2, defined as the space between the lens cover and the vertical side wall 42 of the housing 40.

The exterior aircraft light unit 2 comprises a mounting structure 50, which in turn comprises a mounting plate 46 and a mounting bracket 48. The mounting bracket 48 is arranged on the top side of the mounting plate 46. An analogous mounting bracket 48' (not shown in FIG. 3) is provided on the bottom side of the mounting plate 46, but is blocked from view in the perspective view of FIG. 3. The mounting structure 50, and in particular the mounting plate 46, divides the inner space of the exterior aircraft light unit 2 between the lens cover and the vertical side wall 42 into an upper partial inner space and a lower partial inner space. Only the components arranged in the upper partial inner space are visible in the perspective viewing direction of FIG. 3.

The mounting plate 46 is a semi-circular mounting plate. It has a semi-circular top surface and semi-circular bottom surface as well as a side face therebetween. The side face is also semi-circular in cross-section, as will be better seen in FIG. 4. On the side face of the mounting plate 46, a plurality of anti-collision light sources 30 are arranged. In particular, a row of adjacent anti-collision light sources 30 are arranged along almost the entire side face of the mounting plate 46.

The exterior aircraft light unit 2 further comprises a first forward navigation light source, which is blocked from view by the mounting bracket 48, and an associated first forward navigation optical system 8, which is a first forward navigation lens 8 in the exemplary embodiment of FIG. 3. Both the first forward navigation light source and the first forward navigation optical system 8 are mounted to the mounting bracket 48. Corresponding components are arranged on the bottom side of the mounting plate 46, as will be explained below.

The exterior aircraft light unit 2 further comprises a first rearward navigation light source, which is blocked from view by the mounting bracket 48 in FIG. 3, and a first rearward navigation optical system 92, which is a first rearward navigation lens 92 in the exemplary embodiment of FIG. 3. Both the first rearward navigation light source and the first rearward navigation optical system 92 are mounted to the mounting bracket 48. Corresponding components are arranged on the bottom side of the mounting plate 46, as will be described below.

The exterior aircraft light unit 2 further comprises an infrared navigation light source 94, which is arranged on the mounting plate 46 in the upper partial inner space of the exterior aircraft light unit 2. In other words, the infrared navigation light source is arranged on the top surface of the mounting plate 46. It is arranged about halfway between the mounting bracket 48 and the side face of the mounting plate 46, approximately in the middle of the mounting plate 46 in the front/rear direction.

The lens cover, which is not shown in FIG. 3, is a hollow structure, which is convex when seen from the outside. This lens cover is arranged over the above described components and forms an enclosure of these components together with the vertical side wall 42. The lens cover is transparent, thus passing the light from the plurality of anti-collision light sources 30, from the first and second forward navigation light sources, from the first and second rearward navigation light sources, and from the infrared navigation light source 94.

Figure 4:
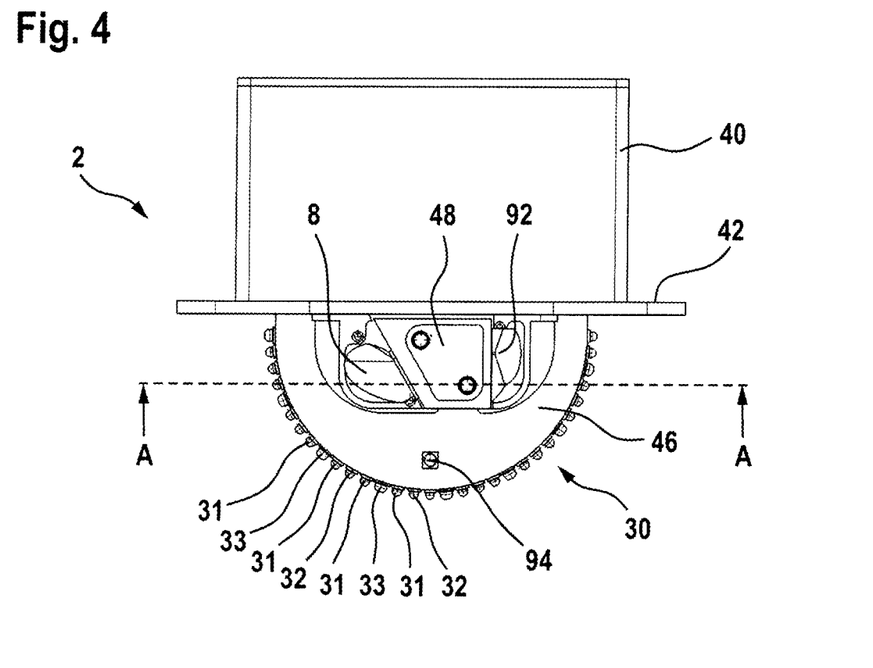
FIG. 4 shows the exterior aircraft light unit of FIG. 3 in a top view.

FIG. 4 shows the exterior aircraft light unit 2 of FIG. 3 in a top view. In this view, it is nicely illustrated that the side face of the mounting plate 46 distal from the housing 40 has a semi-circular shape. It is also nicely illustrated that the plurality of anti-collision light sources 30 are arranged in a row along said side face.

The plurality of anti-collision light sources, which in its entirety is referred to with reference numeral 30, comprises a plurality of white anti-collision light sources 31, a plurality of red anti-collision light sources 32, and a plurality of infrared anti-collision light sources 33. These white anti-collision light sources 31, red anti-collision light sources 32, and infrared anti-collision sources 33 are arranged in a regular, periodic pattern. In particular, in the exemplary embodiment depicted, a periodic pattern of a white anti-collision light source 31, an infrared anti-collision light source 33, a white anti-collision light source 31, and a red anti-collision light source 32 is arranged, with two such unit patterns being provided with reference numerals in FIG. 4. Other arrangements of the different kinds of anti-collision light sources are possible as well.

Figure 5:
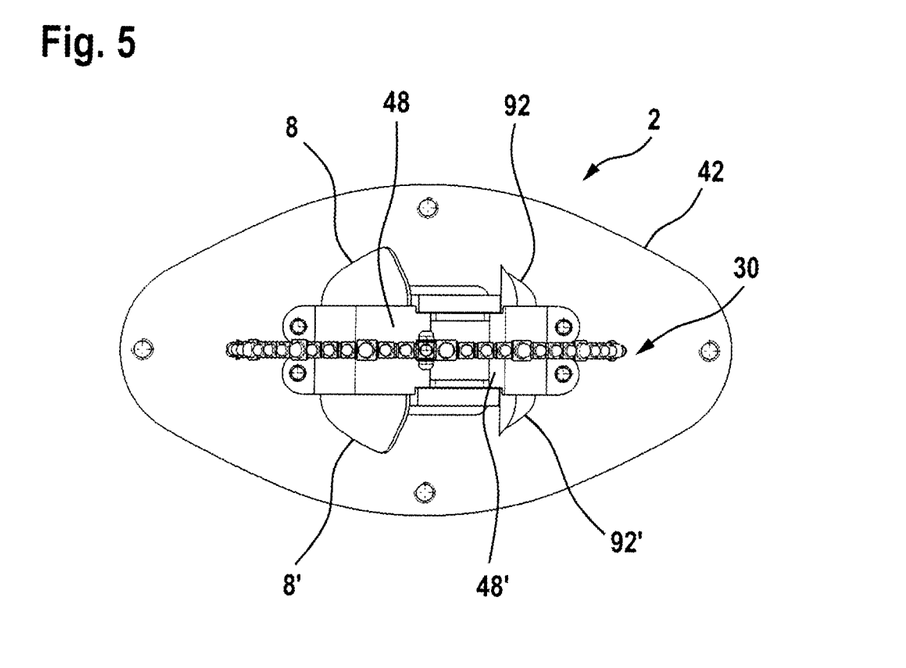
FIG. 5 shows the exterior aircraft light unit of FIG. 3 in a side view.

FIG. 5 shows the exterior aircraft light unit 2 of FIG. 3 in a side view. This view nicely illustrates that the components in the inner space of the exterior air-craft light unit 2 are generally symmetrical with respect to the plane of extension of the mounting plate 46, which plane of the extension is generally referred to as the first cross-sectional plane, which is a horizontal cross-sectional plane through the exterior aircraft light unit 2. In particular, a first mounting bracket 48, as shown in FIGS. 3 and 4, is disposed in the upper partial inner space of the exterior aircraft light unit 2, while a second mounting bracket 48' is disposed in the lower partial inner space of the exterior aircraft light unit.

As described above, the first forward navigation optical system 8 and the first rearward navigation optical system 92 are arranged in the upper partial inner space of the exterior aircraft light unit 2. Further, a second forward navigation optical system 8' and a second rearward navigation optical system 92' are arranged in the lower partial inner space of the exterior aircraft light unit 2. The first and second forward navigation optical systems 8, 8' and the first and second rearward navigation optical systems 92, 92' are mirror images of each other.

Figure 6:
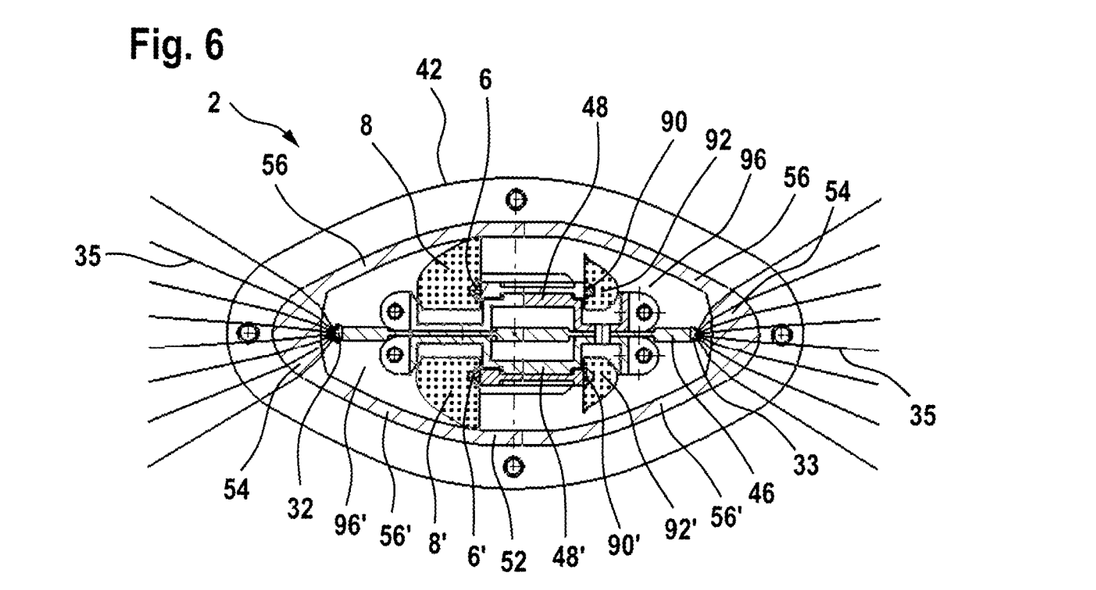
FIG. 6 shows the exterior aircraft light unit of FIG. 3 in a vertical cross-sectional view, with the anti-collision light sources being operational.

FIG. 6 shows a vertical cross-sectional view through the exterior aircraft light unit 2 of FIGS. 3-5, with the cross-sectional plane being indicated by line A-A in FIG. 4. In FIG. 6, the exterior aircraft light unit 2 is depicted with the lens cover 52, which was omitted from FIGS. 3-5. The lens cover 52 is also symmetrical with respect to the plane of extension of the mounting plate 46. Further, the lens cover 52 may have a rotationally symmetric geometry, i.e. a geometry that is substantially the same in all vertical cross-sections running through the center of the vertical side wall 42.

The lens cover 52 has a refractive portion 54, with two cross-sections through this generally curved refractive portion 54 being shown in FIG. 6. Further, the lens cover 52 has a first light passage portion 56 and a second light passages portion 56'. The refractive portion 54 extends in and around the plane of extension of the mounting plate 46, while the first and second light passage portions 56, 56' form the upper and lower parts of the lens cover 52.

The cross-section of FIG. 6 is chosen in such a way that it runs through the first forward navigation light source 6, a second forward navigation light source 6', which is arranged in the lower partial inner space as a mirror image of the first forward navigation light source 6, the first rearward navigation light source 90, and a second rearward navigation light source 90', which is arranged in the lower partial inner space as a mirror image of the first rearward navigation light source 90. The first and second forward navigation light sources 6, 6' are arranged immediately adjacent to the first and second forward navigation optical systems 8, 8'. Also, the first and the second rearward navigation light sources 90, 90' are arranged immediately adjacent to the first and second rearward navigation optical systems 92, 92'.

The refraction by the refractive portion 54 of the lens cover 52 is illustrated in FIG. 6 by a plurality of exemplary light rays 35. In the cross-sectional plane of FIG. 6, a red anti-collision light source 32 and an infrared anti-collision light source 33 are arranged. The anti-collision light sources emit light in a wide angle in the vertical cross-sectional plane of FIG. 6. The refractive portion 54 of the lens cover 52 is shaped to achieve a slight reduction of this opening angle. In this way, the anti-collision light output still has a relatively wide opening angle in vertical cross-sectional planes, but also has a high light intensity in the horizontal direction.

The plurality of anti-collision light sources 30 are configured to emit respective sequences of warning light flashes in operation. In particular, depending on the given operating condition, the white, red and infrared anti-collision light sources may be operated at different times or at the same time. This in particular may depend whether the aircraft is on the ground or in the air and whether it is a day-time flight or night-time flight.

Figure 7:
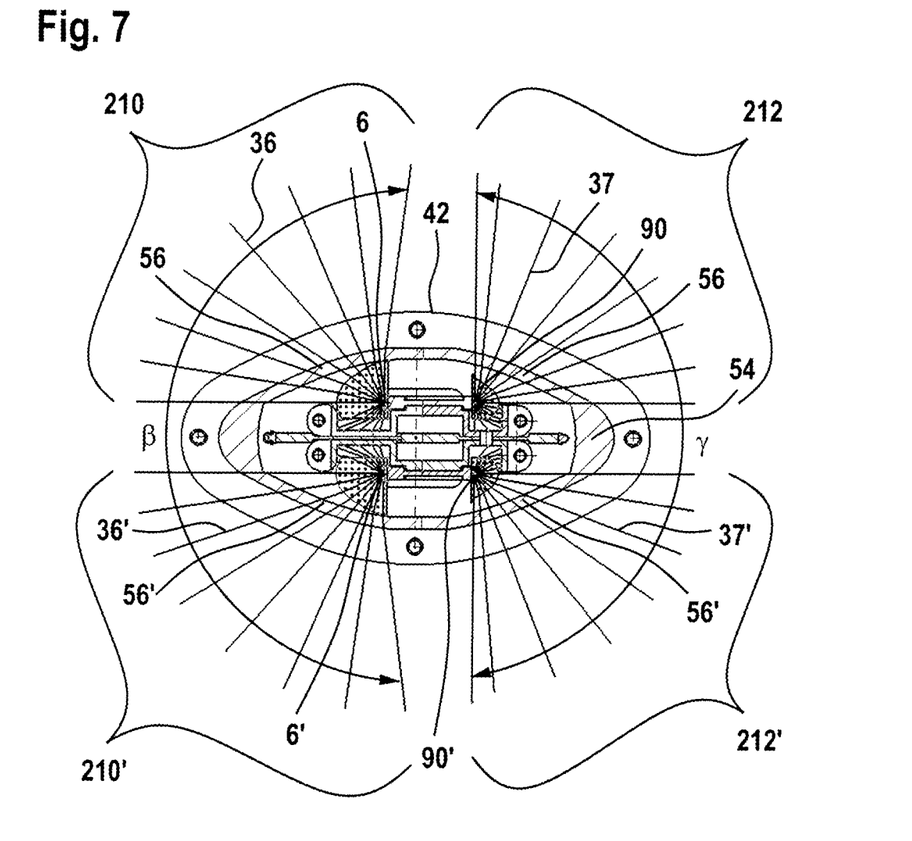
FIG. 7 shows the exterior aircraft light unit of FIG. 3 in the vertical cross-sectional view of FIG. 6, with the forward navigation light sources and the rearward navigation light sources being operational.

FIG. 7 shows the exterior aircraft light unit 2 of FIGS. 3-5 in the same cross-sectional view as FIG. 6. However, as compared to FIG. 6, where the operation of the plurality of anti-collision light sources is illustrated with light rays 35, the operation of the first and second forward navigation light sources 6, 6' and the first and second rearward navigation light sources 90, 90' is illustrated in FIG. 7.

The light from the first forward navigation light source 6 provides a first forward navigation light output 210, which has a vertical opening angle of about 95°. This is depicted by exemplary light rays 36. Analogously, the light emitted from the second forward navigation light source 6' provides a second forward navigation light output 210', which also has a vertical opening angle of about 95°. This is illustrated by exemplary light rays 36'. Together, the light from the first and second forward navigation light sources 6, 6' provide for a forward navigation light output, having a vertical forward navigation light output opening angle $\beta$ of about 190°. It is possible that the forward navigation light output opening angle $\beta$ is between 160° and 200°, in particular between 180° and 200°, further in particular about 180° in the depicted vertical cross-sectional plane.

The light from the first and second forward navigation light sources 6, 6' passes through the lens cover 52 in the first and second light passage portions 56, 56'. The light is substantially unaltered in direction by the first and second light passage portions 56, 56'. Further, the light from the first and second forward navigation light sources 6, 6' does not pass through the refractive portion 54 of the lens cover 52. Instead, it leaves the lens cover 52 to the top and bottom sides thereof The light from the first rearward navigation light source 90 provides a first rearward navigation light output 212, which has a vertical opening angle of about 90°. This is depicted by exemplary light rays 37. Analogously, the light emitted from the second rearward navigation light source 90' provides a second rearward navigation light output 212', which also has a vertical opening angle of about 90°. This is illustrated by exemplary light rays 37'. Together, the light from the first and second rearward navigation light sources 90, 90' provide for a rearward navigation light output, having a vertical rearward navigation light output opening angle $\gamma$ of about 180°. It is possible that the rearward navigation light output opening angle $\gamma$ is between 160° and 200°, in particular between 180° and 200° in the depicted vertical cross-sectional plane.

The light from the first and second rearward navigation light sources 90, 90' passes through the lens cover 52 in the first and second light passage portions 56, 56'. The light is substantially unaltered in direction by the first and second light passage portions 56, 56'. Further, the light from the first and second rearward navigation light sources 90, 90' does not pass through the refractive portion 54 of the lens cover 52. Instead, it leaves the lens cover 52 to the top and bottom sides thereof The first and second forward navigation light sources 6, 6' and the first and second rearward navigation light sources 90, 90' are continuously operated when the aircraft is in flight, at least in bad weather or night-time conditions. The first and second forward navigation light source 6, 6' continuously emit light of red or green color, depending whether the exterior aircraft light unit 2 is used on the left or on the right side of the aircraft. The first and second rearward navigation light sources 90, 90' continuously emit light of white color. The infrared navigation light source may be operated whenever desired for alerting other aircraft equipped with infrared vision.

The exterior aircraft light unit may comprise a control unit that controls all of or any subset of the anti-collision light sources, including the white anti-collision light sources, the red anti-collision light sources, and the infrared anti-collision light sources, the first and second forward navigation light sources, the first and second rearward navigation light sources, and the infrared navigation light source.

With the provision of two such exterior aircraft light units on the left and right sides of the aircraft, all of above described lighting functionalities can be achieved with only those two light units. As compared to previous approaches, where up to 14 separate light units were used for these functionalities, a very large reduction of the number of light units can be achieved. In this way, all or any subset of weight reductions, power consumption reductions, maintenance effort reductions, and reductions of detrimental aerodynamic effects may be achieved.

Figure 8:
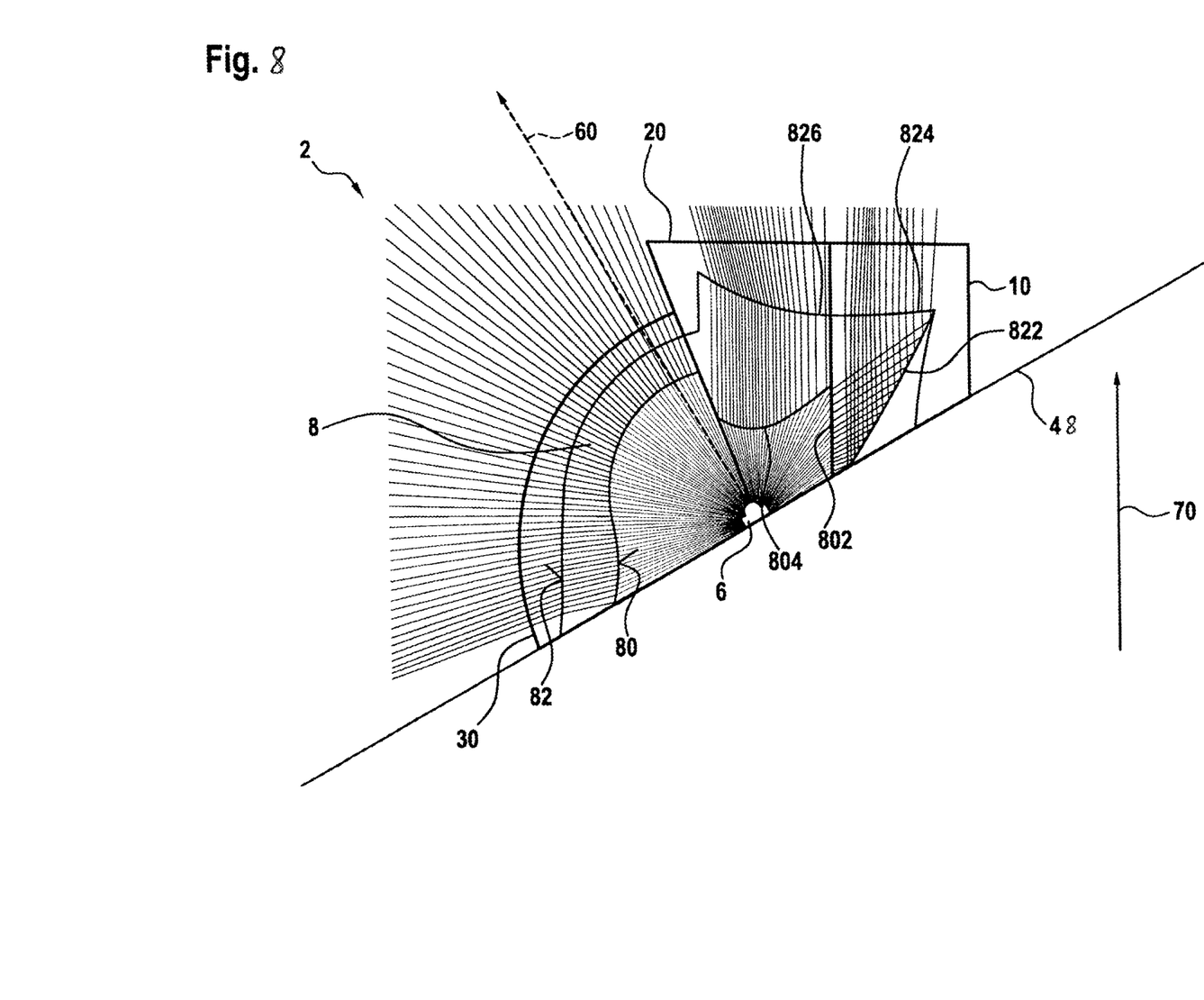
FIG. 8 shows a combination of a forward navigation light source and an associated forward navigation optical system, to be used in an exterior aircraft light unit in accordance with an exemplary embodiment of the invention, in a cross-sectional view.

FIG. 8 shows a cross-sectional view of a first forward navigation light source 6 and a first forward navigation optical system 8, to be used in an exterior air-craft light unit 2 in accordance with an exemplary embodiment of the invention. In particular, the exterior aircraft light unit 2, as described above with respect to FIGS. 1-7, may comprise a first forward navigation light source 6 and a first forward navigation optical system 8, as described with respect to FIG. 8, arranged on the mounting structure 50, in particular arranged on the mounting bracket 48. The second forward navigation light source and the second forward navigation optical system may have an analogous configuration.

The cross-sectional view of FIG. 8 of the first forward navigation light source 6, which is an LED in the exemplary embodiment of FIG. 8, and the first forward navigation optical system 8, which is a lens in the exemplary embodiment of FIG. 8, is a horizontal cross-sectional view. The combination of the first forward navigation light source 6 and the first forward navigation optical system 8 is shown to be oriented in a way as it is oriented after being assembled to the aircraft during use. In particular, it is shown that the first forward navigation light source 6 and the first forward navigation optical system 8 are at an angle with respect to a longitudinal direction 70 of the aircraft.

The first forward navigation light source 6 has a source-side light intensity distribution, which is Gaussian. A principle light emission direction 60 of the first forward navigation light source 6 is orthogonal to the support surface of the support bracket 48. The principle light emission direction 60 refers to the direction of the highest light intensity of the first forward navigation light source 6 in the absence of all optical elements.

The first forward navigation optical system 8 is a solid lens structure having an inner surface 80 and an outer surface 82. The first forward navigation optical system 8 has three distinct transformation segments, namely a first transformation segment 10, a second transformation segment 20, and a third transformation segment 30. The transformation segments 10, 20, 30 transform a source-side light intensity distribution into an output light intensity distribution. The extensions of the transformation segments are defined in terms of their angular regions on the inner surface 80. In particular, the first transformation segment 10 extends over an angle of 30° of the inner surface. This angular range of 30° extends from +90° to +60°, when measured from the principle light emission direction 60. The second transformation segment 20 extends over an angle of 50°. In particular, the second transformation segment extends from +60° to +10°, when measured with respect to the principle light emission direction 60. The third transformation segment 30 extends over an angle of 100°. In particular it extends from +10° to −90°, when measured with respect to the principle light emission direction 60.

The paths of the light rays are described as follows with respect to the individual transformation segments. Within the first transformation segment 10, the light rays from the first forward navigation light source 6 are first slightly refracted at the inner surface 80 of the first forward navigation optical system 8. In the cross-sectional plane of FIG. 8, the inner surface 80 has a straight section in the first transformation segment 10, denoted with reference numeral 802. After being slightly refracted, the light rays hit a plane of total internal reflection, denoted with reference numeral 822. At this plane, the light rays are completely reflected towards the top of the drawing plane of FIG. 8, i.e. roughly into the longitudinal direction 70 of the air-craft. The surface 822 of total internal reflection is part of the outer surface 82 of the first forward navigation optical system 8. In the cross-sectional plane of FIG. 8, the surface 822 has a straight contour. As the surface 822 of total internal reflection is not planer outside of the drawing plane of FIG. 8, but has a curved shape, the outside contour of the outer surface 82 behind the drawing plane of FIG. 8 is also visible in FIG. 8. After experiencing total internal reflection, the light rays pass a straight portion of the outer surface 82, denoted with reference numeral 824. Only minimal refraction takes place at this surface 824. The light rays leave the first forward navigation optical system 8 within a narrow angular range of less than 10° with respect to the longitudinal direction 70 of the aircraft. This narrow range between 0° and 10° with respect to the longitudinal direction 70 of the aircraft is the peak region of the forward navigation light output.

In the second transformation segment 20, the light rays from the first forward navigation light source 6 hit a convex portion 804 of the inner surface 80. The portion 804 is convex when viewed from the first forward navigation light source 6. The surface 804 has such a convex shape that the light rays are substantially collimated within the first forward navigation optical system 8 in the second transformation segment 20. In other words, the light rays travel through the first forward navigation optical system 8 in an aligned manner in the second transformation segment 20. The outer surface 82 of the first forward navigation optical system 8 has a concave portion 826 in the second transformation segment 20. The surface 826 is concave when viewed from the outside of the first forward navigation optical system 8. This surface 826 disperses the collimated light from within the first forward navigation optical system 8 and distributes the light rays across an angular range of 20°. In particular, the light rays are divided up between the longitudinal direction 70 of the aircraft and an angle of 20° thereto. In this way, the light rays leaving the second transformation segment 20 contribute to above discussed peak region in the forward navigation light output and also form a medium intensity region between 10° and 20° with respect to the longitudinal direction 70 of the aircraft.

The inner surface 80 and the outer surface 82 are mainly spherical in the third transformation segment 30. In particular, they are both spherical from the border with the second transformation segment 20 to a chamfer region close to the support portion 4. In this chamfer region, the light rays from the first forward navigation light source 6 are somewhat diverted from the mounting bracket 48 through respective chamfer surfaces at the inner surface 80 and at the outer surface 82. In this way, the light rays leaving the third transformation segment 30 are within an angular range of between 20° and 110° with respect to the longitudinal direction 70 of the aircraft. This angular region forms a low intensity region of the forward navigation light output.

With this set-up, the first forward navigation optical system 8 allows for a bundling and diverting of light from the first forward navigation light source 6 in such a way that the FAR requirements for forward navigation lights are satisfied.

It is pointed out that the combination of the first forward navigation light source 6 and the first forward navigation optical system 8, as described with respect to FIG. 8, is an exemplary combination of a light source and an optical system and that various other combinations of light sources and optical systems may be employed. The first forward navigation light source 6 and the first forward navigation optical system 8, as described with respect to FIG. 8, have been described as an example where a combination of a single light source and a single optical system are used.

The combination of the second forward navigation light source and the second forward navigation optical system may be analogous to the combination described above with respect to FIG. 8. Further, the respective combinations of first and second rearward navigation light sources and rearward navigation optical systems may have similar configurations, albeit with different opening angles in the horizontal cross-sectional plane, or other suitable configurations.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An exterior aircraft light unit, comprising:
   a housing,
   a mounting structure, mounted to the housing and extending away from the housing substantially along a first cross-sectional plane,
   a lens cover, mounted to the housing, surrounding the mounting structure, and defining an inner space of the exterior aircraft light unit, with the mounting structure dividing the inner space of the exterior aircraft light unit into a first partial inner space and a second partial inner space,
   a plurality of anti-collision light sources, configured to emit respective sequences of warning light flashes in operation, wherein the plurality of anti-collision light sources are arranged on the mounting structure and jointly provide for an anti-collision light output opening angle ($\alpha$) of at least 180° in the first cross-sectional plane,
   at least one first forward navigation light source and at least one first forward navigation optical system, configured to emit a continuous first forward navigation light output in operation, wherein the at least one first forward navigation light source and the at least one first forward navigation optical system are arranged in the first partial inner space, and
   at least one second forward navigation light source and at least one second forward navigation optical system, configured to emit a continuous second forward navigation light output in operation, wherein the at least one second forward navigation light source and the at least one second forward navigation optical system are arranged in the second partial inner space,
   wherein the first forward navigation light output and the second forward navigation light output jointly provide for a forward navigation light output opening angle ($\beta$) of at least 160° in a second cross-sectional plane, substantially orthogonal to the first cross-sectional plane,
   wherein the mounting structure comprises a mounting plate having a curved side face, distal from the housing, and wherein the plurality of anti-collision light sources are arranged on the curved side face.

2. The exterior aircraft light unit according to claim 1, wherein the plurality of anti-collision light sources are arranged on the mounting structure in a curved pattern.

3. The exterior aircraft light unit according to claim 1, wherein the curved side face is one of substantially circular and substantially elliptical.

4. The exterior aircraft light unit according to claim 1, wherein the plurality of anti-collision light sources comprise at least one of:
   a plurality of white anti-collision light sources,
   a plurality of red anti-collision light sources, and
   a plurality of infrared anti-collision light sources.

5. The exterior aircraft light unit according to claim 1, wherein the lens cover has a refractive portion, extending around the first cross-sectional plane, with the refractive portion shaping an anti-collision light output of the warning light flashes.

6. The exterior aircraft light unit according to claim 5, wherein the lens cover has a first light passage portion and a second light passage portion, with the first and second light passage portions being arranged on opposite sides of the refractive portion and passing light from the at least one first forward navigation light source and from the at least one second forward navigation light source substantially unrefracted.

7. The exterior aircraft light unit according to claim 1, further comprising:
   at least one first rearward navigation light source and at least one first rearward navigation optical system, configured to emit a continuous first rearward navigation light output in operation, wherein the at least one first rearward navigation light source and the at least one first rearward navigation optical system are arranged in the first partial inner space, and at least one second rearward navigation light source and at least one second rearward navigation optical system, configured to emit a continuous second rearward navigation light output in operation, wherein the at least one second rearward navigation light source and the at least one second rearward navigation optical system are arranged in the second partial inner space, wherein the first rearward navigation light output and the second rearward navigation light output jointly provide for a rearward navigation light output opening angle (γ) of at least 160° in a third cross-sectional plane, substantially orthogonal to the first cross-sectional plane.

8. The exterior aircraft light unit according to claim 1, further comprising an infrared navigation light source, configured to emit a continuous infrared navigation light output in operation, wherein the infrared navigation light source is arranged in the first partial inner space, in particular mounted on the mounting structure in the first partial inner space.

9. The exterior aircraft light unit according to claim 1, wherein the first cross-sectional plane is a horizontal cross-sectional plane, wherein the first partial inner space is an upper inner space of the exterior aircraft light unit, and wherein the second partial inner space is a lower inner space of the exterior aircraft light unit.

10. The exterior aircraft light unit according to claim 1, configured to be mounted to at least one of a lateral end portion of a horizontal stabilizer of a helicopter, a lateral side portion of a fuselage of a helicopter, and a lateral end portion of a wing of an airplane.

11. A helicopter, comprising a first exterior aircraft light unit in accordance with claim 1 and a second exterior aircraft light unit in accordance with claim 1, wherein the first exterior aircraft light unit is arranged on a left side of the helicopter and the second exterior aircraft light unit is arranged on a right side of the helicopter.

12. The helicopter according to claim 11, wherein the helicopter has a horizontal stabilizer, wherein the first exterior aircraft light unit is mounted to a left lateral end portion of the horizontal stabilizer, and wherein the second exterior aircraft light unit is mounted to a right lateral end portion of the horizontal stabilizer.

13. An airplane, comprising a first exterior aircraft light unit in accordance with claim 1 and a second exterior aircraft light unit in accordance claim 1, wherein the first exterior aircraft light unit is arranged on a left side of the airplane and the second exterior aircraft light unit is arranged on a right side of the airplane.

14. An airplane according to claim 13, wherein the airplane has a left wing with a left lateral end portion and a right wing with a right lateral end portion, wherein the first exterior aircraft light unit is mounted to the left lateral end portion, and wherein the second exterior aircraft light unit is mounted to the right lateral end portion.

15. An exterior aircraft light unit, comprising:
a housing,
a mounting structure, mounted to the housing and extending away from the housing substantially along a first cross-sectional plane,
a lens cover, mounted to the housing, surrounding the mounting structure, and defining an inner space of the exterior aircraft light unit, with the mounting structure dividing the inner space of the exterior aircraft light unit into a first partial inner space and a second partial inner space,
a plurality of anti-collision light sources, configured to emit respective sequences of warning light flashes in operation, wherein the plurality of anti-collision light sources are arranged on the mounting structure and jointly provide for an anti-collision light output opening angle (α) of at least 180° in the first cross-sectional plane,
at least one first forward navigation light source and at least one first forward navigation optical system, configured to emit a continuous first forward navigation light output in operation, wherein the at least one first forward navigation light source and the at least one first forward navigation optical system are arranged in the first partial inner space, and
at least one second forward navigation light source and at least one second forward navigation optical system, configured to emit a continuous second forward navigation light output in operation, wherein the at least one second forward navigation light source and the at least one second forward navigation optical system are arranged in the second partial inner space,
wherein the first forward navigation light output and the second forward navigation light output jointly provide for a forward navigation light output opening angle (β) of at least 160° in a second cross-sectional plane, substantially orthogonal to the first cross-sectional plane,
wherein the lens cover has a refractive portion, extending around the first cross-sectional plane, with the refractive portion shaping an anti-collision light output of the warning light flashes.

16. The exterior aircraft light unit according to claim 15, wherein the lens cover has a first light passage portion and a second light passage portion, with the first and second light passage portions being arranged on opposite sides of the refractive portion and passing light from the at least one first forward navigation light source and from the at least one second forward navigation light source substantially unrefracted.

* * * * *